United States Patent [19]
Nguyen et al.

[11] Patent Number: 6,078,696
[45] Date of Patent: Jun. 20, 2000

[54] HVQ COMPRESSION OF DATA AND PRINTING HINTS

[75] Inventors: Uoc H. Nguyen, Long Beach; Kien T. Nguyen, Torrance; Abraham E. Claproth, Culver City; Thanh D. Truong, Walnut, all of Calif.

[73] Assignee: Xerox Corporation, Stamford, Conn.

[21] Appl. No.: 09/106,734

[22] Filed: Jun. 29, 1998

[51] Int. Cl.[7] .............................. G06K 9/36; G06K 9/38; G06K 9/46
[52] U.S. Cl. ............................ 382/253; 382/244
[58] Field of Search ................... 382/244, 246, 382/253

[56] References Cited

U.S. PATENT DOCUMENTS 5,602,589  2/1997  Vishwanath et al. ................ 348/398
5,999,710  12/1999  Smith et al. ........................ 395/114

*Primary Examiner*—Phuoc Tran
*Attorney, Agent, or Firm*—Robert Cunha

[57] ABSTRACT

Printing hints can be efficiently compressed in a system using hierarchical compression (HVQ) by first using HVQ to generate compressed codewords, and then adding the printing hint to the codewords to generate an intermediate form of codeword, before sending this intermediate form to a pattern matching lossless compressor for final compression. Even though the same printing hint may be applied to a number of codewords, the overall compression will be affected very little by the addition of the printing hints since the hints are identical over a large number of codewords in series.

1 Claim, 7 Drawing Sheets area of Table 1 (2x2), Text
area of Table 2 (2x2), Mixed
area of Table 3 (4x2), Contone area of Table 1 (4x2), Text
area of Table 2 (2x2), Mixed
area of Table 3 (4x2), Contone

HVQ COMPRESSION OF DATA AND PRINTING HINTS

BACKGROUND

A data compression system where the compressor not only receives printing hints which are used to determine which compression process to use, but also includes the printing hints in the compressed output for use by subsequent printing stages; the inclusion not materially affecting the compression ratio through the use of a lossy and a lossless compression stage in series.

When data must be transmitted or stored it is usually compressed first, to reduce the transmission time or storage requirement. This is especially true of image data which can consist of four color separations of 8-bit pixels.

One method of compression is "hierarchical vector quantization" (HVQ), where a block of data can be reduced to a single codeword in a number of steps. This method is described in U.S. Pat. No. 5,602,589, and is incorporated by reference herein. This procedure can be explained most clearly by the use of a numerical example in connection with FIG. 1a of that patent. Assume that a 2 by 4 pixel block, 8 bits per pixel, is to be compressed to one 9-bit number. First, each pair of pixels is applied to a stage 1 look up table (LUT) containing 9-bit code words, each code word being associated with a two-pixel bit pattern. The table is set up so that if an exact match of the input pixel bits is not available, then a codeword associated with the closest match is output instead. The ultimate output of this stage 1 is four codewords, each describing the closest match to the bit pattern of the two input pixels. Since the exact match frequently is not possible, this compression is inherently lossy to some extent. The output of the first stage is four 9-bit codewords.

Assuming this amount of compression is not sufficient, these four codewords, each representing the bit pattern of a 1 by 2 pixel block are next applied to two stage 2 tables, resulting in a total of two 9-bit output codewords, each representing the bit pattern of a 2 by 2 pixel block. If the compression is still insufficient, these two are applied to the stage 3 table to yield the final output word, which is associated with a 2 by 4 pixel block. It can now be seen that this method is hierarchical in that a plurality of stages are used, it involves vectors since the input pixels have a directional relationship with each other, and is quantized in that a number of levels can be implemented to achieve any degree of compression.

For decompression, each codeword is simply applied to a 256 K by 64 bit LUT which outputs the bit pattern of the entire 8-pixel block.

SUMMARY OF THE INVENTION

Printing hints are sometimes generated in a printing system at the scanner or text generator to indicate to various printing elements the type of data that is being received. The system will then be able to optimize its compression elements for the data. A problem is that the hints are supplied on data lines separate from the data, which complicates the system. On the other hand, if the hints are incorporated in the data stream, there would be a problem of separating them out, and also the data compression ratio would suffer if the hints were included in the output data. This invention solves the problem by using lossy and lossless compressors in series. The lossy compressor compresses the data and then adds the hint to the data, which makes the data output longer. However, this is followed by an LZ compressor which looks for previously used data patterns. To the extent that the current and previous data patterns have the same hint, which is almost always the case, then the length of the pattern does not matter, and the compression ratio will not be affected significantly. A compressor using HVQ may be used for the lossy stage.

DETAILED DESCRIPTION OF THE INVENTION

Figure 1:
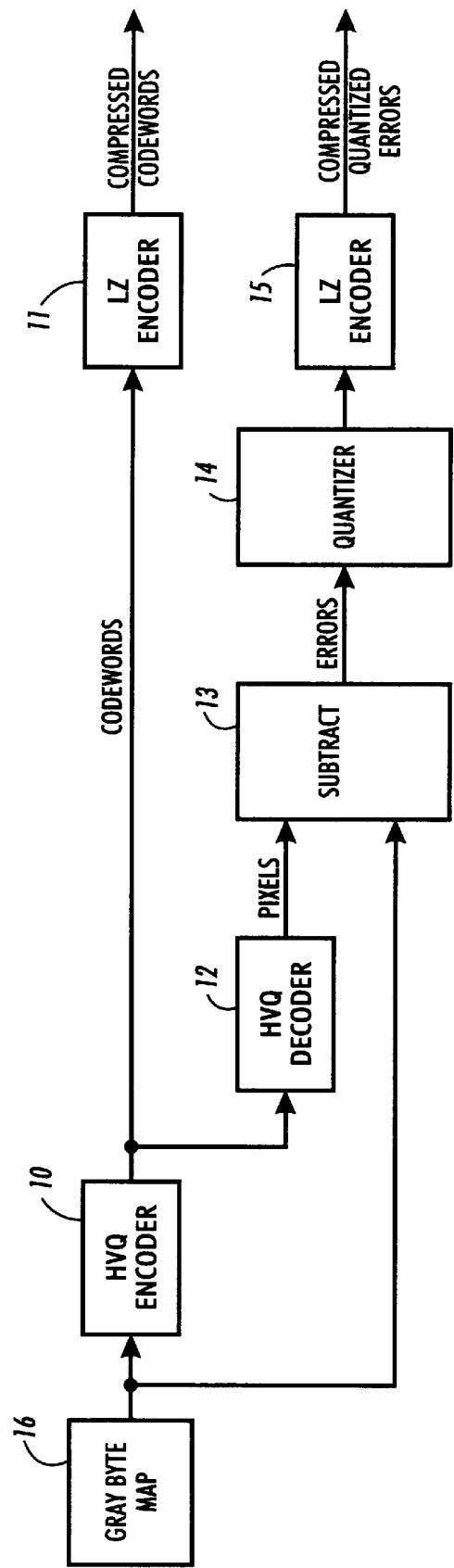
FIG. 1 is an HVQ encoder which has a parallel error channel.

The basic HVQ system can be improved by adding an error channel as shown in FIG. 1. In the upper channel the grayscale byte map 16 is applied in the usual way to an HVQ decoder 10, the output is losslessly compressed in an LZ encoder 11, and the result is sent to the decoder, usually in the form of 8 to 10-bit words.

In addition, the output of the HVQ encoder is sent to a decoder 12 in scanline format which produces a version of the original byte map which may be different from the original because of errors possibly introduced by the lossy encoder. The two byte maps are then subtracted 13, pixel by pixel, to produce error terms which, if added to the output codeword, will produce the original byte map. This subtraction can also be done by using an exclusive OR, which is simpler and faster and does not require a sign bit. These error terms, each a signed quantity 8-bits wide or less, can then be compressed in an LZ encoder 15 and sent to the decoder in parallel with the original output. The larger the error term, the less will be the compression ratio. In practice, small errors are not visually detectable. To limit the degradation of the compression ratio, the error term can be limited to a few most significant bits, three for example, in quantizer 14. Normally, the amount of error for a pixel will not be large enough to show up in the few MSB's, in which case there will be no error term at all.

Figure 2:
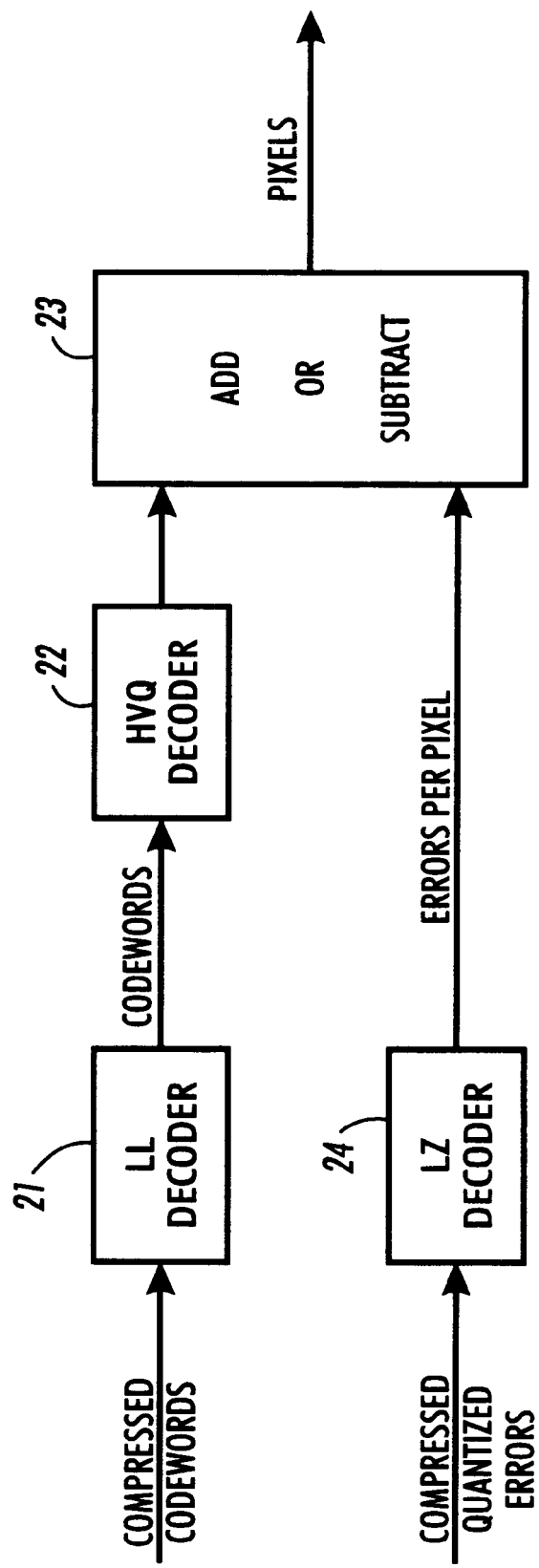
FIG. 2 is the decoder for the arrangement of FIG. 1.

The quantized error decoder is shown in FIG. 2. The compressed code words are LZ decoded in decoder 21 and HVQ decoded in decoder 22 to produce one term for the adder 23. The compressed quantized errors are LZ decoded in decoder 24 and applied as the other term to the adder 23, the output of which is output video. The adder 23 can either be an adder adding a sign bit and seven bits, or an exclusive OR if one was used to generate the error term in the encoder.

Figure 3:
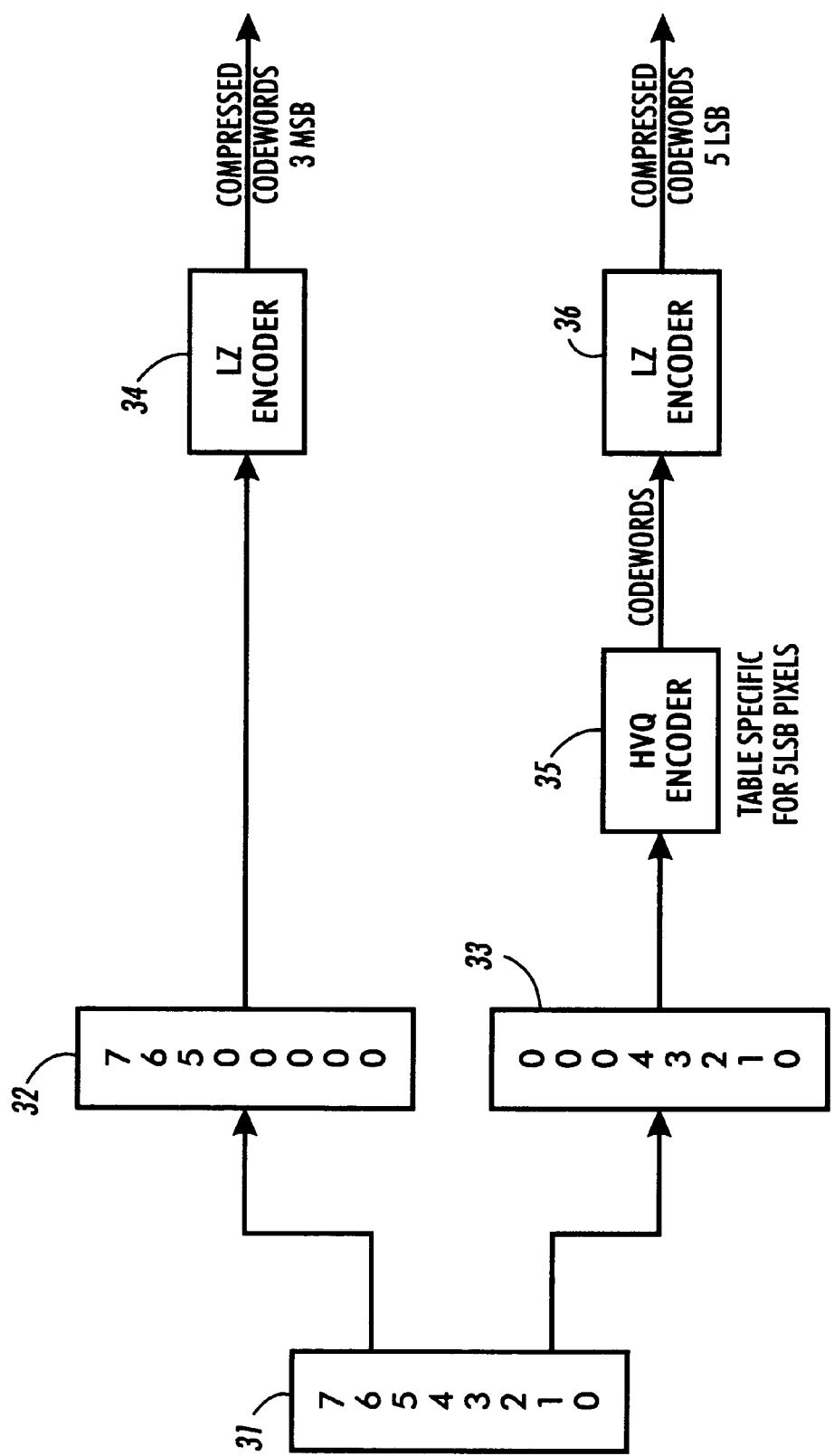
FIG. 3 is a one-channel arrangement for coding a pixel split into its most and least significant bits.
Figure 4:
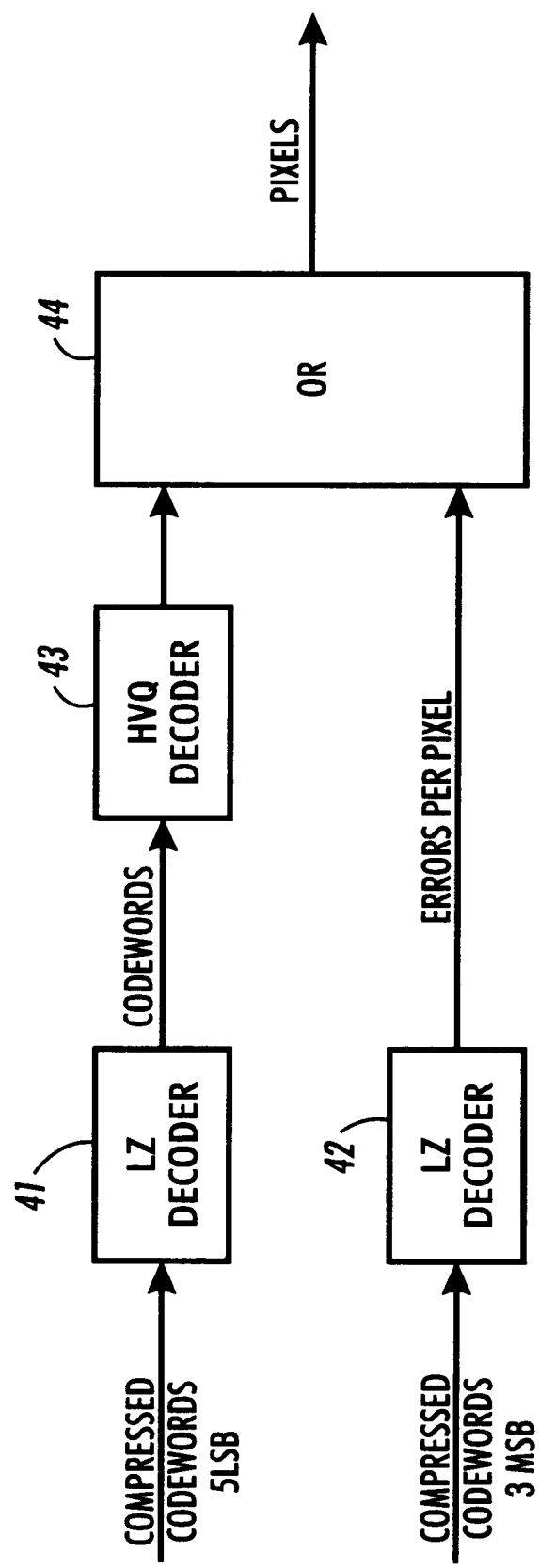
FIG. 4 is a one-channel arrangement for decoding a pixel split into its most and least significant bits.

FIG. 3 shows the arrangement when a single code word 31 is split into most and least significant parts, 32, 33, and where only the least significant bits are compressed. In this case bits 0 through 4 are sent through lossy compressor 35 while bits 5 through 7 are not. Both are then compressed using lossless LZ compression and output to the decoder shown in FIG. 4. Here again, both channels are LZ decompressed while only the LSB's are HVQ decoded. The two resultant parts are then exclusive ORed 44 together to be applied to the decoding look up table.

Figure 5:
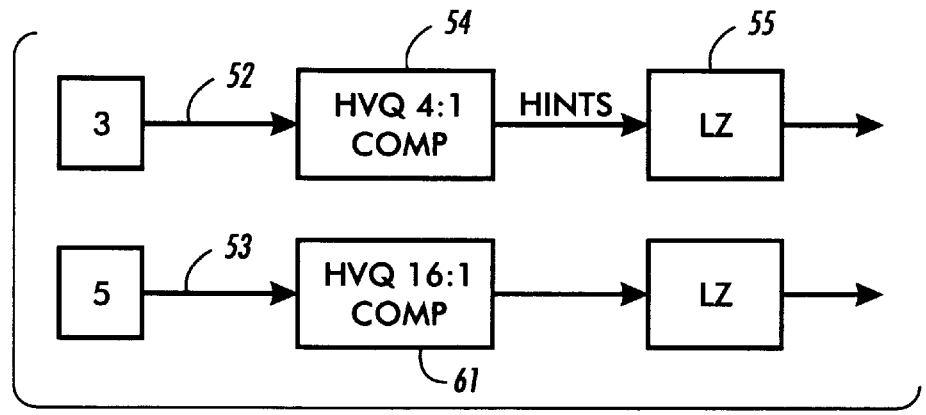
FIG. 5 is a two-channel arrangement for coding a pixel split into its most and least significant bits.

FIG. 5 is a system where a single pixel is separated into a least significant segment and a most significant segment, and where a separate and different compression process is used for each segment, the least significant bits being more compressed. The original pixel is separated into its most significant bits 52 and least significant bits 53. The result is that the most significant bits, being the most important, are less compressed while compression for the least significant bits has a better compression ratio. A programmable look-up table could be used to split the input pixel into any two segments other than the 3–5 split shown.

Figure 6:
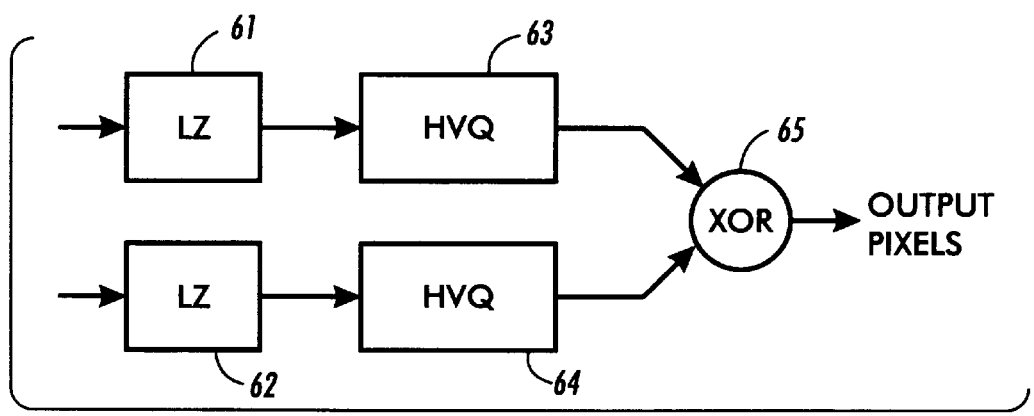
FIG. 6 is a decoder for the coder of FIG. 5.

FIG. 6 is the decoder for the encoder of FIG. 5. The two compressed outputs of FIG. 5 are applied to LZ decoders 61, 62 and HVQ 63, 64 decoded. Then both are applied to an exclusive OR gate 65 to assemble the entire pixel. Of course, if the encoder used some other combination of encoders, the decoder would use the same form of decoding. That is, more generally, the data words in a string can be divided into more and less significant bits to create two parallel strings, and then compressed using any two methods of compression where the greater compression is applied to less significant bits.

Figure 7:
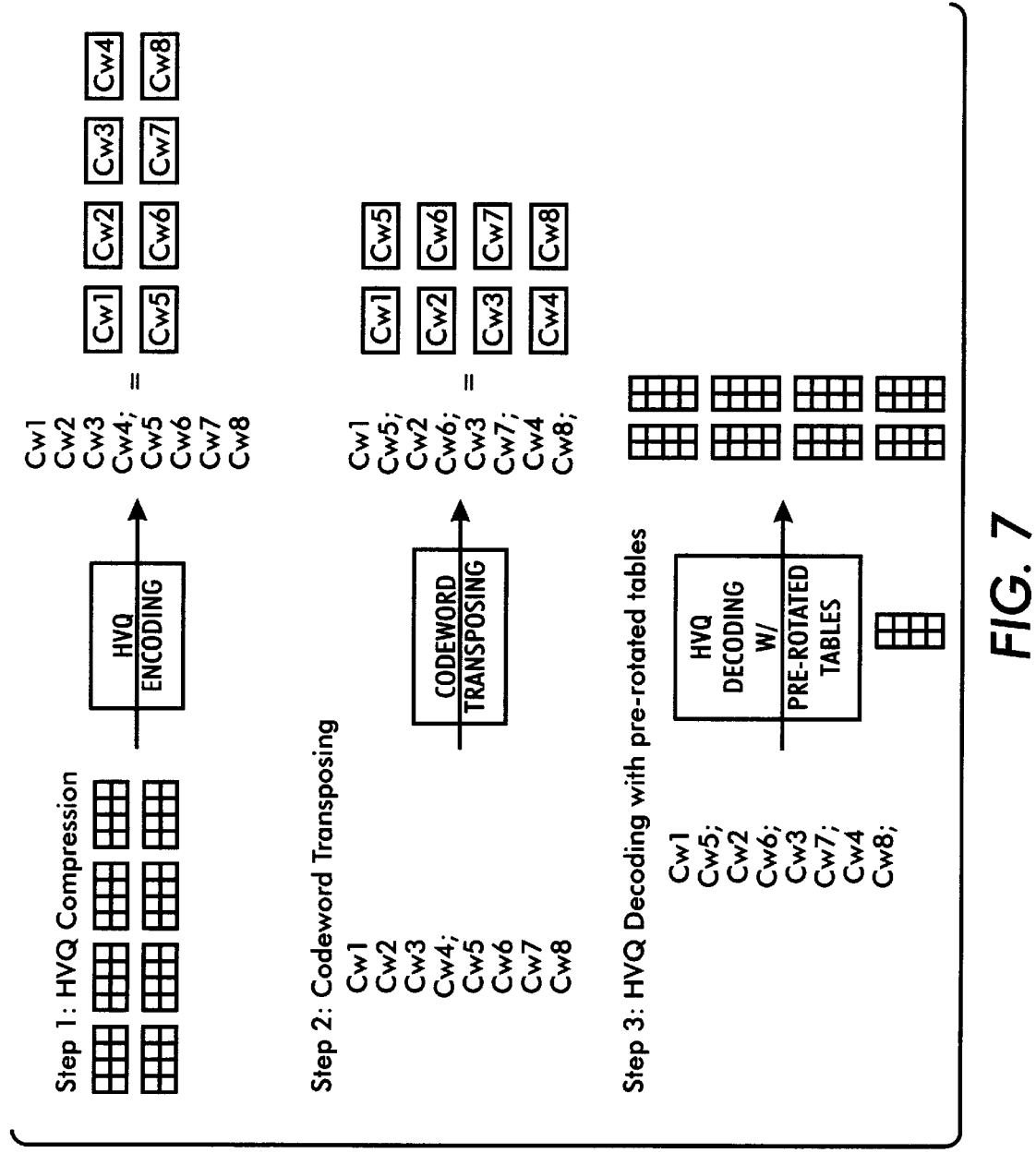
FIG. 7 shows thee prices of rotating or mirror imaging an image using HVQ compression.

HVQ compression is easily adapted to image rotation and mirror imaging as shown in FIG. 7. The process is shown here using the example of an original image that is four pixels high and sixteen pixels wide, and must be rotated ninety degrees clockwise and mirror imaged.

Step 1 is the usual compression process of reducing the eight 8-pixel segments to eight codewords Cw1 to Cw8. Step 2 is the step of rearranging the codewords into the rotated and mirror imaged order. This hardware can be in the form of wiring where the second word in, for example Cw2, is connected to the third word out, as shown. Step 2 can have several sets of wiring, each set delivering a different rotation. Finally, decoding step 3 uses a look-up table to produce a pixel pattern for each segment that is properly oriented. Here again, several tables can be used to produce various orientations.

Printing hints may be incorporated into the original data supplied by the user in the original page description language to indicate to the printer how the data may best be printed. For example, a hint word may be two bits in length, and indicate one of four possibilities, that the following data is text, contone, graphics, etc. For example, if the printer is receiving data that originated as a computer generated graphic it may use a different halftone screen than it would if the original data was screened in from a photograph.

Printing hints may be added to any HVQ channel as shown in FIG. 5. Assume that for each 4 pixel block entering into the HVQ encoder 54 there is produced one codeword 9 bits in length, contained in two 8-bit bytes, so that the first 8 bits are contained in the first byte and the last bit is contained in the second byte. Then the 2-bit hint is added. Now, each codeword plus hint is 11 bits, still contained in two bytes. The LZ encoder looks at a string of bytes, perhaps 256 bytes in length, and determines the location and size of the most recent identical pattern match. To the extent that the hint changes once or twice within that string, there will be a slightly decreased amount of compression in comparison to the amount that would have resulted with no hints. However, to the extent that the hint does not change during that time, there is no decrease in compression at all. The result is that printing hints can be supplied after an HVQ compressor but before the lossless compressor with very little effect on the compression ratio. At the output side, after the code words are LZ decompressed, but before being decoded, the hints can be extracted for later use.

The losses of an HVQ compressor can be further minimized by choosing codewords and output data patterns that have the best chance of matching the actual input data patterns. For example, first consider text. If text pixels are being encoded in 4 by 2 pixel groups, and the four input pixels in one line are black, dark gray, light gray and white, and the input video was scanned-in text, the data most likely originally was a boundary between a black letter and a white space, so the output pixel pattern could be black, black, white, white. On the other hand, if the original input data was a scanned-in computer generated graphic, the four pixels are more likely to be a smooth decrease in density from black to white. The actual determination of the encoder codewords and patterns in the decoder look-up table are determined by statistical analysis. A representative group of text and graphic documents are passed through a test program and the best values are generated for each type.

A complication arises when a boundary passes through an input block of pixels, in which case neither text nor graphic values can be used for the entire block. The solution is to supply a third set of codewords and patterns which are generated specifically for this boundary condition. In this case a set of documents containing both text and graphics would be analyzed to produce one set of patterns, which would be used when a boundary, mixed, condition is determined to be within the block.

The boundary condition is sensed by observing the printing hints. For example, a rectangular scanned-in picture is typically located on a page of text by its x,y coordinates. When the raster output scanner beam is within the coordinates, the printing hints will indicate to the printer which codewords, look-up table entries and halftone screens to use. If the hint changes from picture to text within the block, for example, then the encoder knows that a boundary exists within the block.

Figure 8:
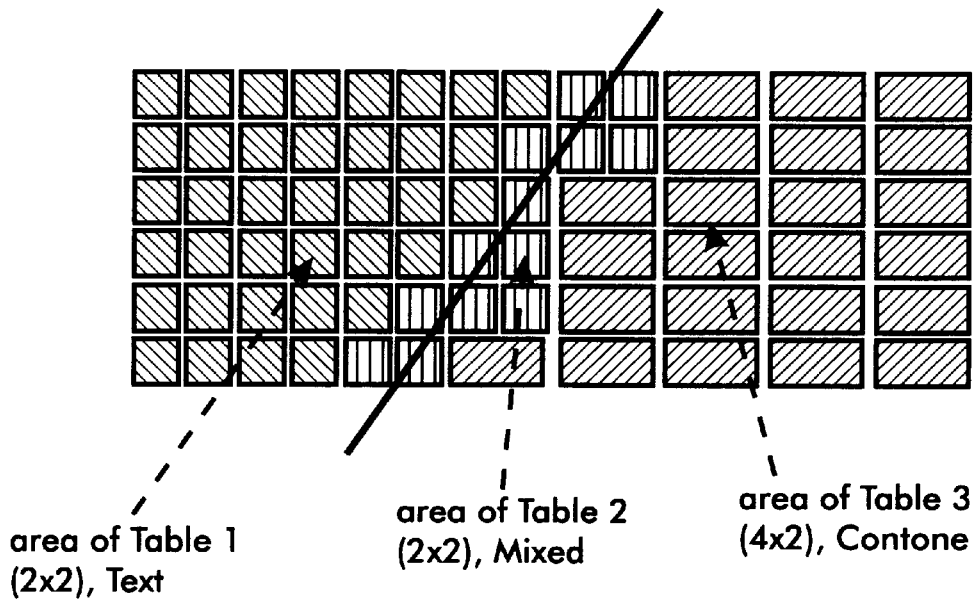
FIG. 8 shows a boundary between blocks of different sizes.

In all cases the block size must be maintained. FIG. 8 is an example of a transition between text and contone. Since different block sizes can be used in HVQ encoders for different kinds of data, the block size for the text is shown here as 2 by 2 pixels to allow greater edge detail while the block size for contone is shown as being 4 by 2 to allow for greater compression.

Figure 9:
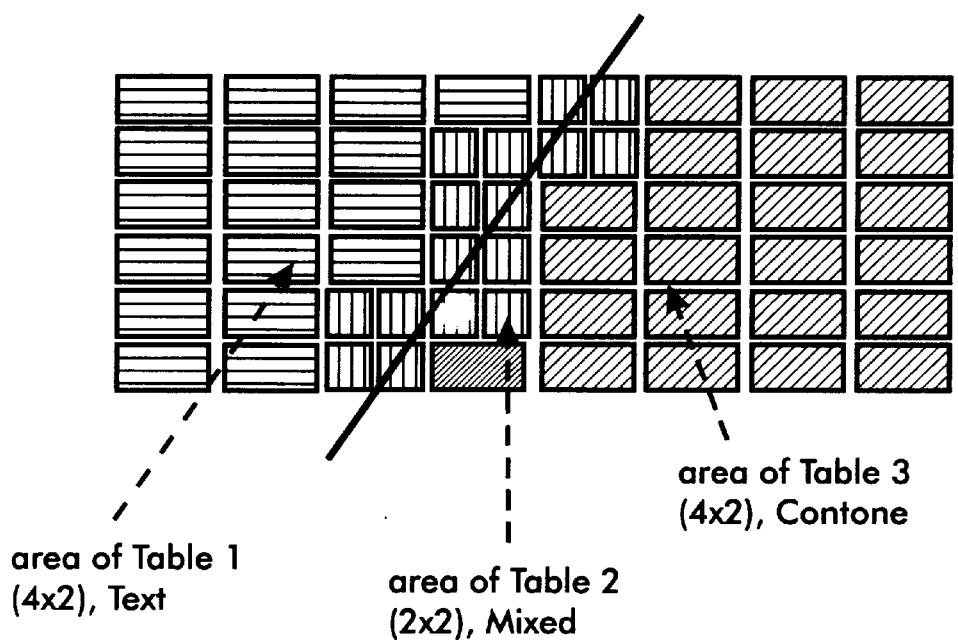
FIG. 9 shows a boundary between blocks of the same size.

If a boundary is within a 2 by 2 pixel block, that block is encoded and decoded using boundary values. In addition, any contone pixels to the right of the boundary such as pixel 81 are also treated as a boundary pixels if necessary so that all remaining pixels to the right of the boundary line will be within 4 by 2 pixel blocks. Similarly, in FIG. 9, showing a boundary between 4 by 2 pixel blocks of text and contone, 2 by 2 pixel boundary blocks are used in pairs so that all remaining blocks will be 4 by 2.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a compressor of the type which compresses a series of data words by compressing several data words into a codeword using hierarchical vector quantization (HVQ) and then using a lossless pattern matching compressor to compress the codeword string, the improvement comprising:

adding a printing hint to the end of a codeword before the codeword is applied to the lossless compressor.

* * * * *